(12) United States Patent
Lederer

(10) Patent No.: US 10,462,302 B2
(45) Date of Patent: Oct. 29, 2019

(54) METHOD FOR ESTABLISHING THE ROUTING, IN PARTICULAR FORWARDING OF AN OBJECT OF A COMMUNICATIONS ACTIVITY, AND DEVICES FOR CARRYING OUT SAID METHOD

(71) Applicant: Unify Patente GmbH & Co. KG, Munich (DE)

(72) Inventor: Thomas Lederer, Herrsching (DE)

(73) Assignee: Unify Patente GmbH & Co. LG, Munich (DE)

( * ) Notice: Subject to any disclaimer, the term of this patent is extended or adjusted under 35 U.S.C. 154(b) by 0 days.

(21) Appl. No.: 16/084,109

(22) PCT Filed: Mar. 8, 2017

(86) PCT No.: PCT/EP2017/055416
§ 371 (c)(1),
(2) Date: Sep. 11, 2018

(87) PCT Pub. No.: WO2017/153458
PCT Pub. Date: Sep. 14, 2017

(65) Prior Publication Data
US 2019/0052757 A1  Feb. 14, 2019

(30) Foreign Application Priority Data

Mar. 11, 2016 (DE) .......................... 10 2016 003 053
Jul. 11, 2016 (DE) .......................... 10 2016 112 685
Aug. 24, 2016 (DE) .......................... 10 2016 115 747

(51) Int. Cl.
*H04M 3/42* (2006.01)
*H04M 3/54* (2006.01)
(Continued)

(52) U.S. Cl.
CPC .............. *H04M 3/54* (2013.01); *G06Q 10/10* (2013.01); *G06Q 10/107* (2013.01); *G06Q 50/01* (2013.01);
(Continued)

(58) Field of Classification Search
CPC ... H04M 3/54; H04M 2201/14; G06O 10/107
(Continued)

(56) References Cited

U.S. PATENT DOCUMENTS 6,442,266 B1  8/2002  Wu
6,631,187 B1  10/2003  Juhola et al.
(Continued)

OTHER PUBLICATIONS

International Search Report and Written Opinion for PCT/EP2017/055416 filed Mar. 8, 2017, dated May 8, 2017.
(Continued)

*Primary Examiner* — William J Deane, Jr.
(74) *Attorney, Agent, or Firm* — Buchanan Ingersoll & Rooney PC

(57) ABSTRACT

In a method for executing the forwarding (or other type of routing) of the object of a communication activity (such as a telephone call, SMS, or e-mail), which is sent from a sender (50) to a first data and/or telephone connection (10, 12, 14) on to a second data and/or telephone connection (20, 22, 24), for the second data and/or telephone connection (20, 22, 24), a first person, in particular from the first data and/or telephone connection (10, 12, 14), defines the second data and/or telephone connection (20, 22, 24), a corresponding notification is sent (in particular to the second data and/or telephone connection (20, 22, 24) or otherwise to the related person U2) and then the user U2 is supposed to give an authorization, wherein the valid definition for executing the forwarding/routing is validly defined at the earliest after a
(Continued)

Figure 1:
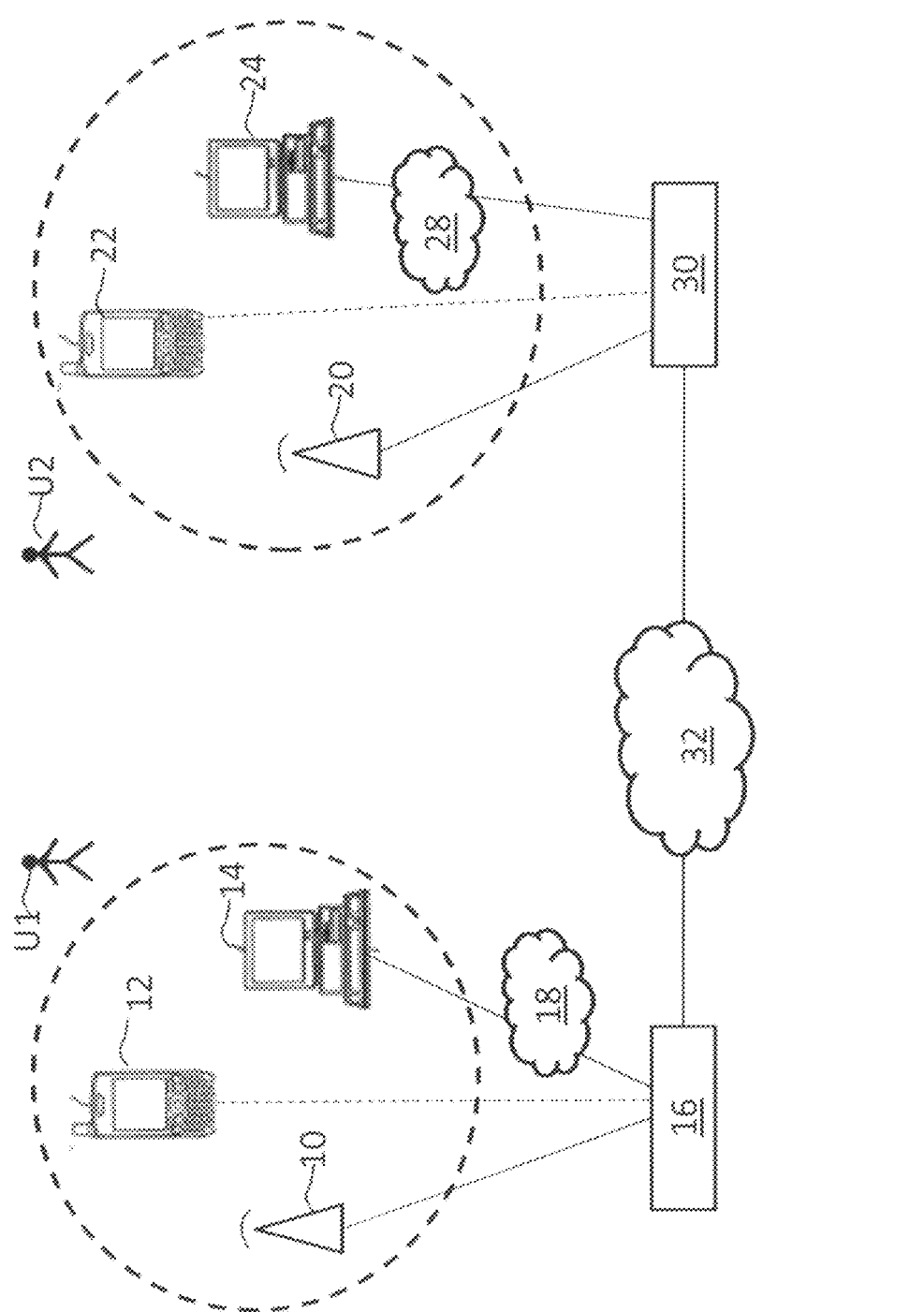

first predetermined time period expires and at the latest after a second predetermined time period $t_{max}$ expires.

20 Claims, 7 Drawing Sheets

(51) Int. Cl.
    *G06Q 10/10*     (2012.01)
    *G06Q 50/00*     (2012.01)
    *H04M 7/00*     (2006.01)
    *H04M 3/00*     (2006.01)
    *H04W 4/14*     (2009.01)

(52) U.S. Cl.
    CPC ............ *H04M 3/00* (2013.01); *H04M 7/0027* (2013.01); *H04M 2201/14* (2013.01); *H04M 2203/6081* (2013.01); *H04W 4/14* (2013.01)

(58) Field of Classification Search
    USPC ........................................ 379/211.02, 211.01
    See application file for complete search history.

(56) References Cited

U.S. PATENT DOCUMENTS

| | | |
|---|---|---|
| 2013/0329878 A1 | 12/2013 | Cazanas et al. |
| 2015/0229770 A1 | 8/2015 | Shuman et al. |

OTHER PUBLICATIONS

ITU-T H.450.3 ():ITU-T H.450.3 Call Diversion Supplementary Service for ITU-T H. 323 Systems.

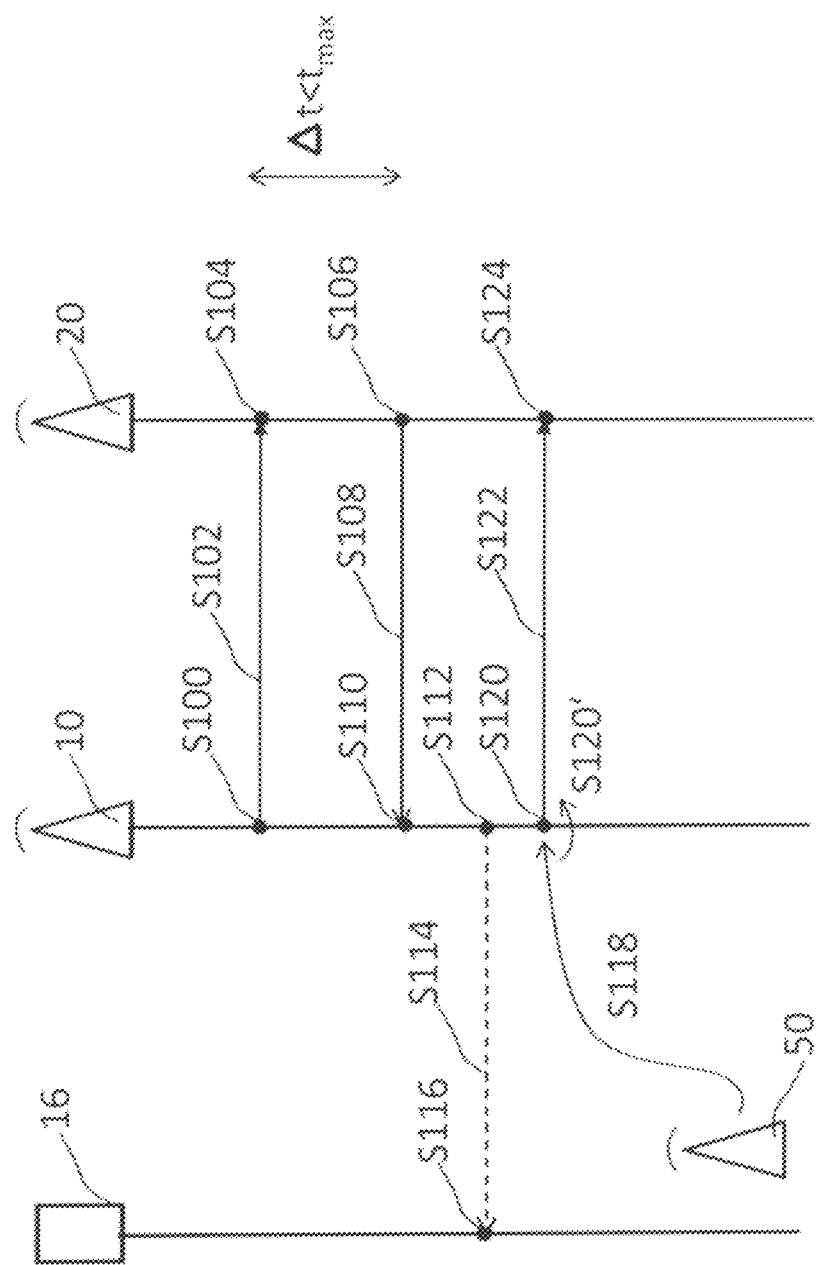

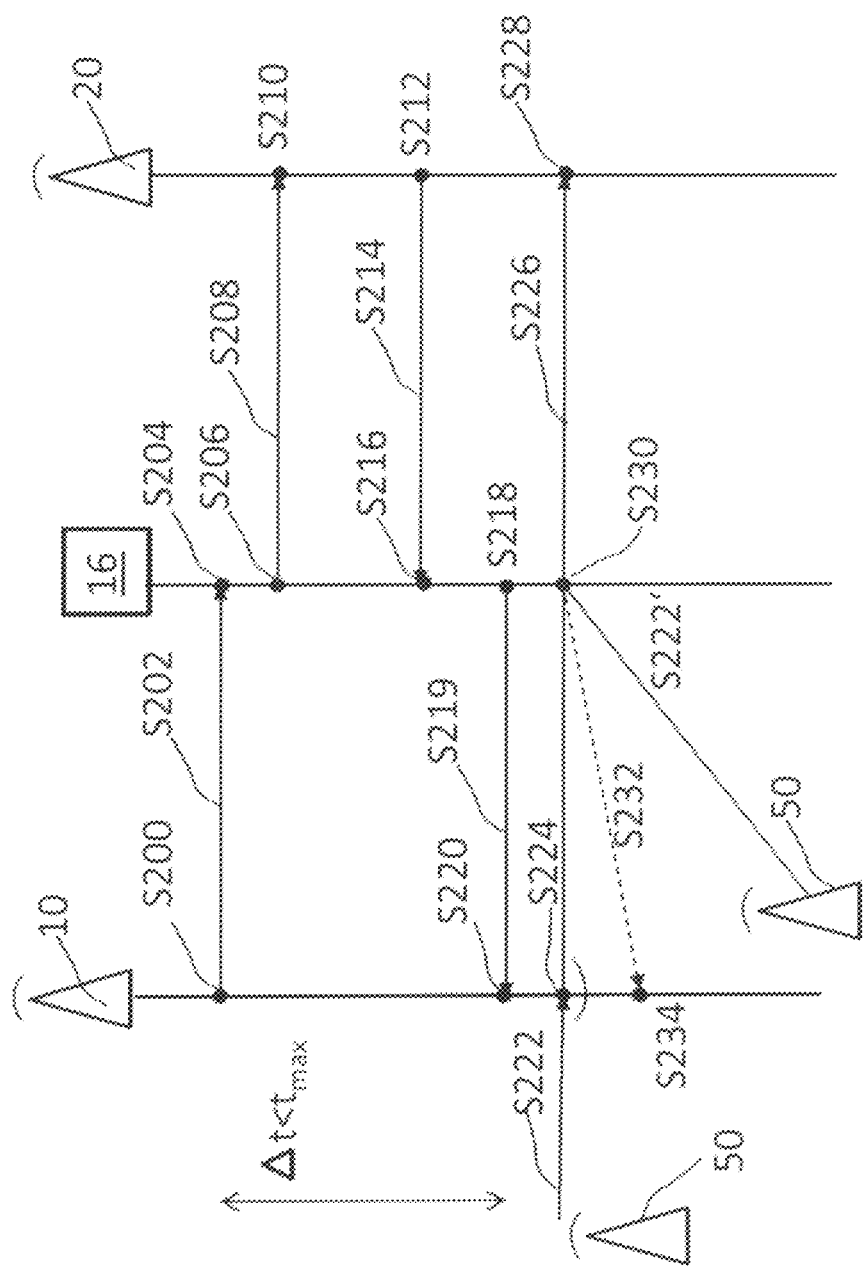

METHOD FOR ESTABLISHING THE ROUTING, IN PARTICULAR FORWARDING OF AN OBJECT OF A COMMUNICATIONS ACTIVITY, AND DEVICES FOR CARRYING OUT SAID METHOD

The invention concerns a method for executing the routing, in particular forwarding, of the object of a communication activity, which is sent from a sender to a first data and/or telephone connection, on to a second data and/or telephone connection. The invention also concerns a communication terminal for use with the method, in one aspect of which the communication terminal should be able to execute the routing from the routing communication terminal, and in another aspect of which a communication terminal should be the receiver of said routing. The invention further concerns a data processing device that can be used in one aspect of the invention with the method according to the invention.

TECHNICAL FIELD

A communication activity is any activity by means of which a communication takes place or immediately follows. For example, the object of a communication activity can be a telephone call, for which a corresponding signal is sent from a first communication terminal to a second communication terminal. The object of a communication activity can further be the establishment of a connection. A communication activity can also immediately complete the object, for example when sending an SMS or MMS using a smartphone. SMS stands for "Short Message Service" and MMS for "Multimedia Messaging Service" herein. The corresponding protocols are widely known. In one alternative, the object of the communication activity can be an e-mail. The communication activity consists of sending it.

Forwarding a telephone call, an SMS, or an e-mail is a function that is generally implemented in particular by digital devices, i.e., by all such types of IP communication devices like Voice-over-IP telephones, Voice-over-IP clients, mobile wireless telephones, or even e-mail clients. Forwarding in particular should be done automatically and is configured and activated on a connected server (mail server or PBX), for example.

It is the subject of the protocol ITU-T H.450.3.

Instead of forwarding, routing the object of a communication activity can also involve the object of the communication activity remaining in the original first data and/or telephone connection to which it was sent by a sender, and only being copied to the second data and/or telephone connection. In telephony, for example, this could include executing an automatic process for setting up a conference call.

The telephone connection can be a fixed network connection or a mobile wireless connection, for example, and is typically designated by a telephone number. A data connection can be any data connection over which an object of a communication activity can be received and sent. Today's further developments of the original ISDN connections are both data and telephone connections.

The execution of a forward should define where future incoming objects of communication activities are forwarded. Here the problem can occur, that the executed forwarding target does not exist. The number or e-mail address might have been given incorrectly or has expired and no longer exists. The user who initiates the forwarding typically has no knowledge of this. It can also occur that the user of the communication terminal to which the forwarding is executed (which is assigned or connected to the second data and/or telephone connection) refuses to receive calls for another person, or even accepting an SMS or e-mail.

BACKGROUND FOR THE INVENTION

The Internet address http://community.freepbx.org/t/call-forward-authorization/6089, accessible since Jul. 21, 2016 on the World Wide Web, also concerns the stated problem.

U.S. Pat. No. 6,631,187 B1 likewise addresses this problem, and offers the solution of requiring authorization from the forwarding target for valid activation of a forward. In this case, queries can be sent to the target.

However, the document does not present an effective way to accomplish this.

U.S. Pat. No. 6,442,266 B1 describes an adaptable system for forwarding telephone calls, which is dependent upon the telephone number of the calling party. It works with a timer.

The German patent application with official file number 10 2016 112 685.3, submitted before the filing date of this application but not yet published on the date of this application, translated to English under the title "Harmonizing telephony conversations involving embedded devices and social media applications," describes a telephone terminal device with which social media and additional services, among other things, can be used and usage-related services can be called up and displayed, even when these services are operating through another terminal device, such as a personal computer. This patent application relates in particular to one aspect of the "Circuit" applet from the company Unify Software and Solutions GmbH & Co. KG. Information on this applet was released on Jul. 21, 2016 on the World Wide Web under the address https://www.circuit.com/de/home. The applet creates a "virtual meeting room" and combines services from different terminal devices so that they can be used together, such as normal (voice) telephony and video telephony, chat, e-mails, use of social networks as well as search function and storage of content in the system.

SUMMARY OF THE INVENTION

One goal of this invention is to present a way in which a forward or other routing of the object of a communication activity, which is sent from a sender to a first data and/or telephone connection, can be effectively and reliably transferred to a second data and/or telephone connection. The goal also involves providing the corresponding devices.

The goal is achieved by means of the method with the features as in patent claim 1, the communication terminal devices as in patent claims 10 and 11, and the data processing equipment as in patent claim 12. Additional advantageous embodiments are the subject matter of the dependent claims.

The method according to the invention includes the following steps:

a) Definition of the second data and/or telephone connection by a first person with respect to a first data and/or telephone connection. This generally includes entering an input via a keyboard on a corresponding input device, a corresponding voice input on a voice input device with a microphone, or something similar.

Next, in step b), a notification is sent regarding the definition of the second data and/or telephone connection—automatically by the device paired with the input device or by the first person—to a person with decision-making authority for the second data and/or telephone connection.

Sending a notification can itself be considered a communication activity, whose object is the notification. The person with decision-making authority can be identical to the first person, but generally it is a second person other than the first person. The notification is generally sent to a telecommunication terminal device or another output device, in particular with an optical display for displaying text or a voice output with a speaker.

In step c), the definition is approved or rejected by the person with decision-making authority for the second data and/or telephone connection for the purpose of authorizing or denying it. Approval can also involve entering an input on the input device, as described above, rejection can be the same or can consist of the absence of such an input, or both variations together are possible. The person with decision-making authority is typically given a display such that pressing a corresponding key, on which a "Y" for "YES" or a comparable text is displayed or which is provided only for that purpose, grants the authorization. Authorization can also be refused in the same manner in response to a corresponding query. For example, the display can say: "Should the forward be authorized," or it can say: "Should authorization be denied as it was the last n times?" where n is a predetermined whole number.

According to the invention, with step a) a time measurement starts to run, and at the earliest at the end of a first predetermined time period and at the latest at the end of a second predetermined time period, depending on whether an authorization or its denial is given, in step c) it is validly defined that the object of a communication activity subsequently sent to the first data and/or telephone connection is actually forwarded to the second data and/or telephone connection. The invention thereby involves a preliminary definition (before the end of the first predetermined time period). Here the first predetermined time period can be shorter than the minimum time required for the notification transmission, the approval or rejection, and if applicable a related input and forward of a corresponding input. Because the valid definition occurs at the latest after the end of a second predetermined time period, in the case of active denial of the authorization (and also if there is no reaction from the person with decision-making authority), the forward can be cancelled. Routing is validly activated only if authorization is given. In the execution process, only objects sent subsequently to the first data and/or telephone connection are actually affected by the routing or forwarding.

A feature of such an embodiment is that forwarding is only performed if approval or authorization occurs (i.e., an activity that grants authorization is performed by the person with decision-making authority) within the two predetermined time periods.

In one variation of this, forwarding takes place immediately upon authorization. In another variation, forwarding does not take place until after the end of the two predetermined time periods. The first variation has the advantage that forwarding is performed extremely quickly; the second variation has the advantage that forwarding is performed in a predetermined and therefore predictable manner. In both variations, forwarding is preferably associated with the fulfillment of additional conditions. The additional conditions can include forwarding occurring only at certain times of day or only on certain days and also only at certain times on those days, if applicable, and otherwise not occurring. It is even possible to define different forwarding targets (i.e., different second data and/or telephone connections) for different times. It is also possible to define a beginning and end of a period during which forwarding is to occur. The additional conditions can either be preset (including typical working hours during which forwarding occurs, for example) or can be defined in step a) by corresponding inputs on an input device by the first person. In addition, it can also advantageously be possible, in step c), for the person with decision-making authorization for the second data and/or telephone connection to modify the additional conditions defined elsewhere. For example, in the case of call forwarding, the person with decision-making authority can indicate that he does not wish to receive any calls at certain times after the end of working hours. In the case of such a modification, the definition is authorized as such, but its details are changed. In a further development of this, the first person can receive a query ("If forwarding occurs only between the times xh and yh, does forwarding then continue?").

Alternatively to the aforementioned activation of forwarding only with or after input of authorization, forwarding (or other routing) can be initiated immediately with step a) and then deactivated if no authorization occurs within the second predetermined time period. This is useful if the typical users of the method are not constantly present on their terminal devices or don't always want to use them. In companies with multiple employees, the second predetermined time period can last from four to ten hours, but in that case the forwarding person should be able to ensure that forwarding is functioning at least at the beginning.

According to a preferred embodiment, authorizing or denying authorization should occur on a telecommunication terminal device or computer assigned to the second data and/or telephone connection. For example, with a data connection or wired network connection, there can even be a cable connection to the telecommunication terminal device. With a mobile wireless connection, a SIM card (SIM stands for "Subscriber Identity Module") is available in the telecommunication terminal device, by means of which a telephone number is assigned that defines the telephone connection. Alternatively, authorizing or denying authorization can or is intended to occur on a third telecommunication terminal device or computer assigned to a third data and/or telephone connection. In this case, it is useful for the same person who is using the telecommunication terminal device or computer assigned to the second data and/or telephone connection to also be the user of this third communication terminal device or computer. This variation is especially useful in the case of forwarding from a fixed network connection to a fixed network connection, and if the message (notification) in step b) and the related authorization or denial of it are intended to take place quickly—then the person who otherwise is using the fixed network connection that is the target of the forwarding can receive the notification on his/her mobile wireless telephone (smart phone or similar).

The definition can take place in step a) with a telecommunication terminal device or computer assigned to the first data and/or telephone connection, which then immediately also sends the notification according to step b). This is a viable arrangement for wireless telephones such as smart phones, for example. Alternatively, for example, the definition can be performed using a computer connected via the World Wide Web to a central server (central data processing unit of a telecommunication network or computer network), which then sends the notification according to step b).

The definition in step a) does not have to be performed using a telecommunication terminal device or computer that is assigned to the first data and/or telephone connection, but rather can be performed using a server (central data processing unit of a telecommunication network or computer network) or also generally via the World Wide Web (logging in to the server through a user interface by inputting a password, etc.). Then the notification is sent in step b) by the central data processing unit of a telecommunication network or computer network (server sends data to a data output, from which the notification is then forwarded out).

In another preferred embodiment, after an authorization on a communication terminal device or computer, a display is provided to the person with decision-making authority for the second data and/or telephone connection, indicating from which data and/or telephone connection a forward is to go out. This function is especially useful if such forwards are often executed and then deactivated after a length of time by multiple people on the same device, as occurs in large companies from which people are frequently absent.

With the method according to the invention, it is further possible to establish the type of communication activity whose object should be routed, and in particular forwarded. For example, a person on a telecommunication terminal device or computer can indicate that telephone calls should be forwarded but SMS messages should not, or vice versa.

The communication terminal device according to the invention, is configured in the first aspect to receive objects of at least one type of communication activity immediately, which are sent from a sender to a data and/or telephone connection assigned to the communication terminal device. This is one side of its communicability. It is further configured to send a first notification indicating that another communication terminal device is or should be the object of routing, in particular forwarding, objects of at least one type of communication activity, which are sent from a sender to the data and/or telephone connection. This is a second side of its communicability, limited to the sender of only the first notification. The communication terminal device starts a time count when the first notification is sent and is further configured to receive a second notification by means of which the routing, in particular forwarding, is authorized or authorization is denied, wherein, if authorization is not received within a predetermined time period, objects of at least one type of communication activity, sent from a sender to the first data and/or telephone connection, are not forwarded to the second data and/or telephone connection, and otherwise such objects of at least one type of communication activity, sent from a sender to the first data and/or telephone connection, are forwarded to the second data and/or telephone connection.

The communication terminal device according to the second aspect is also configured to immediately receive objects of at least one type of communication activity, sent from a sender to a data and/or telephone connection assigned to the communication terminal device, and it can further receive a notification indicating that the communication terminal device is now or should be the target of a routing, in particular forwarding, of objects of at least one type of communication activity, sent from a sender to a data and/or telephone connection that before that was not assigned to the communication terminal device, and it can perform an operating activity based on the received notification in order to authorize or deny authorization for the routing, in particular forwarding, wherein a time measurement begins when the notification is received and the operating activity is initiated during a predetermined time period after the beginning of the time measurement.

For the first communication terminal device, the time measurement takes place on the communication terminal device of the person desiring the forwarding, and for the second aspect the time measurement takes place on the side of the person who is the target of the forwarding.

In an additional aspect, a data processing unit is used in the method according to the invention. This is configured:
to receive objects of at least one type of communication activity immediately from a sender and route them to a first or second data and/or telephone connection,
to receive a first notification from the first data and/or telephone connection, indicating that the second data and/or telephone connection is or should be the target of routing, in particular forwarding, objects of at least one type of communication activity, which are sent from a sender to the first data and/or telephone connection.
to send a second notification to the second data and/or telephone connection in order to initiate the execution of an operating activity, with which the routing, in particular forwarding, is authorized or the authorization is denied,
to start a time measurement when the first notification is received or the second notification is sent,
and is further configured to receive a third notification that is sent based on an operating activity, wherein, if the third notification is not received within a predetermined time period, objects of at least one type of communication activity, sent from a sender to the first data and/or telephone connection, are not forwarded to the second data and/or telephone connection, and otherwise such objects of at least one type of communication activity, sent from a sender to the first data and/or telephone connection, are forwarded to the second data and/or telephone connection.

In this third aspect, the data processing unit is configured in particular as a server, through which forwarding can be performed centrally. Alternatively to the first notification being received via the first data and/or telephone connection, it can also be received by another input device. Likewise, the second notification can also be sent to a third data and/or telephone connection.

The invention is described below with reference to the drawings, in which

FIG. 1 schematically shows participants in a communication or data network with which the invention can be used.

Figure 4A:
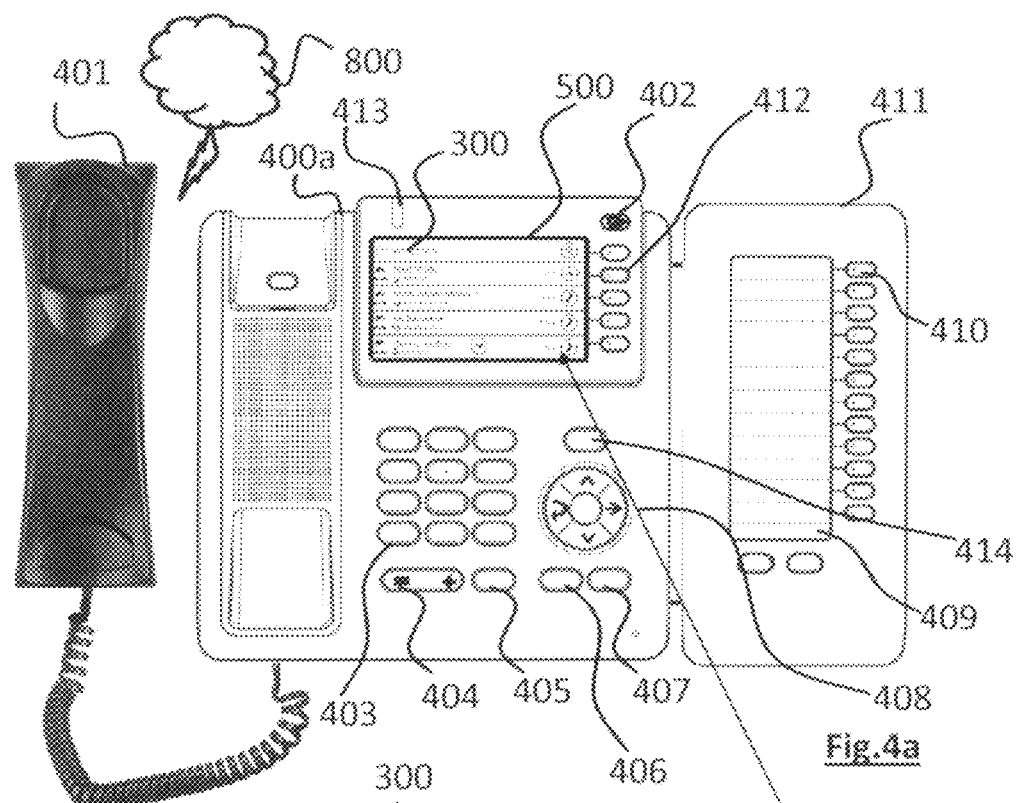
Figure 4B:
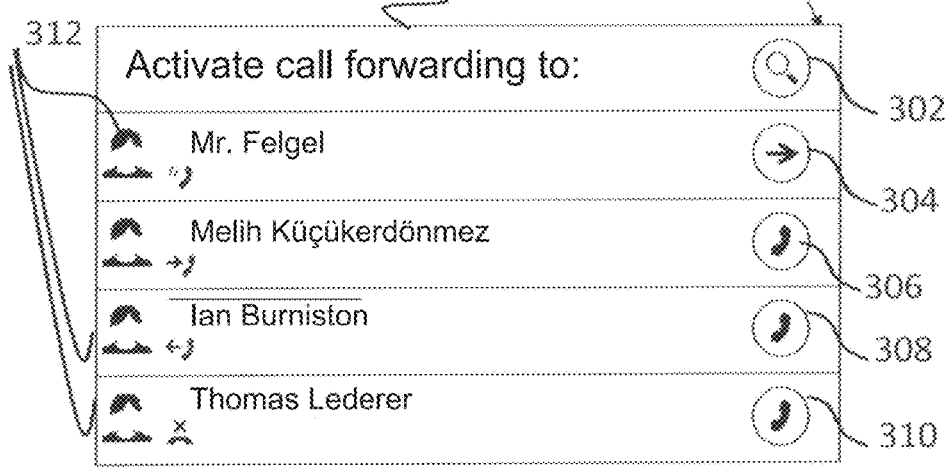
Figures 5A, 5B:
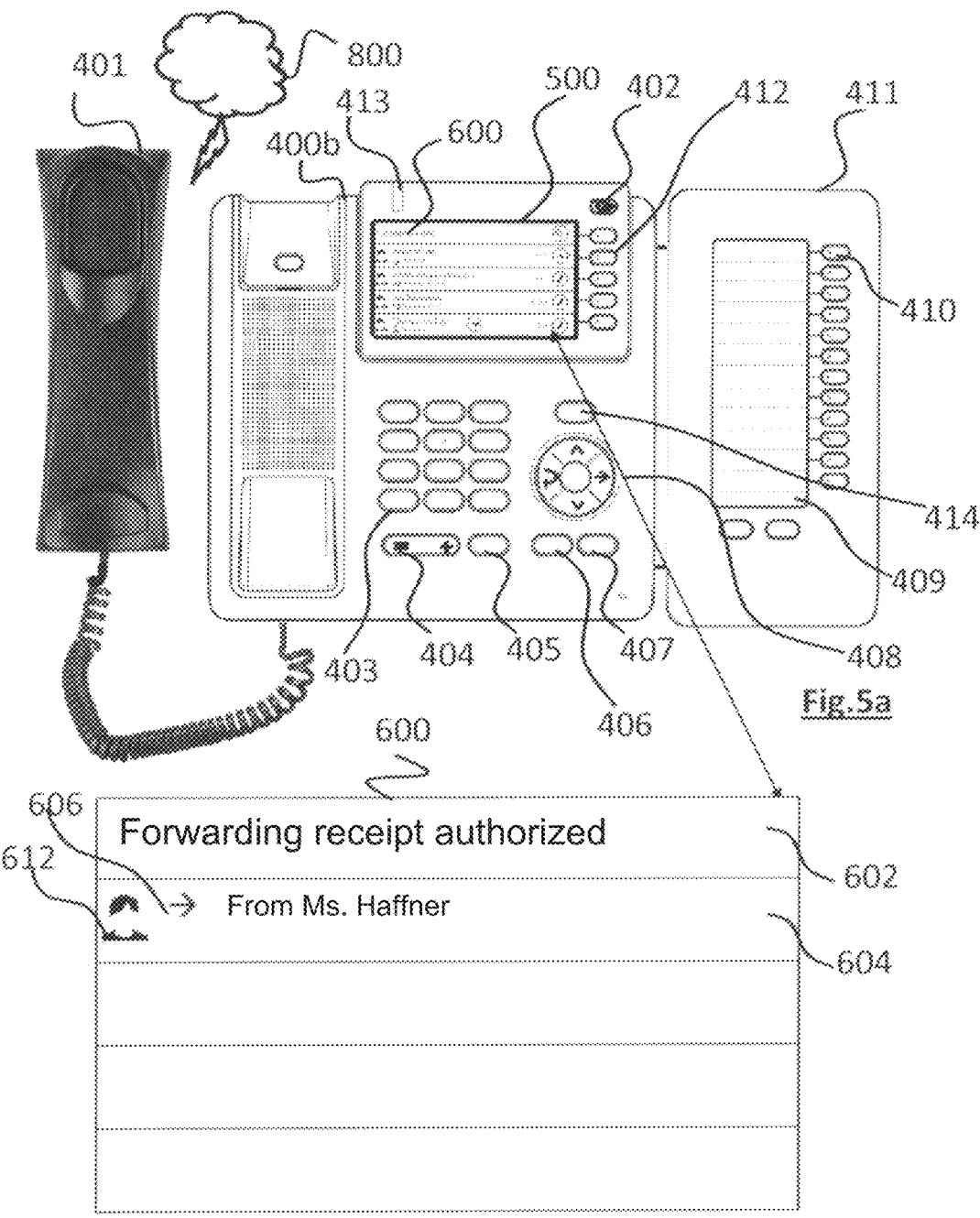
Figure 6A:
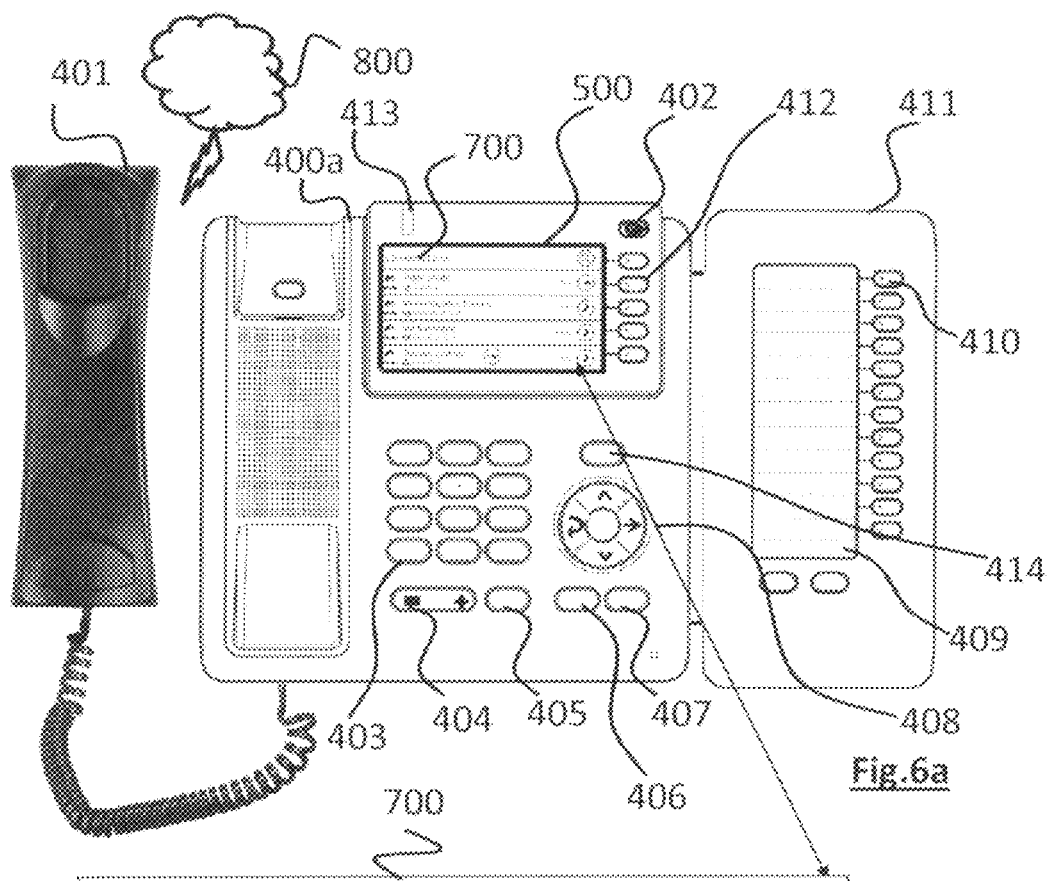
Figure 6B:
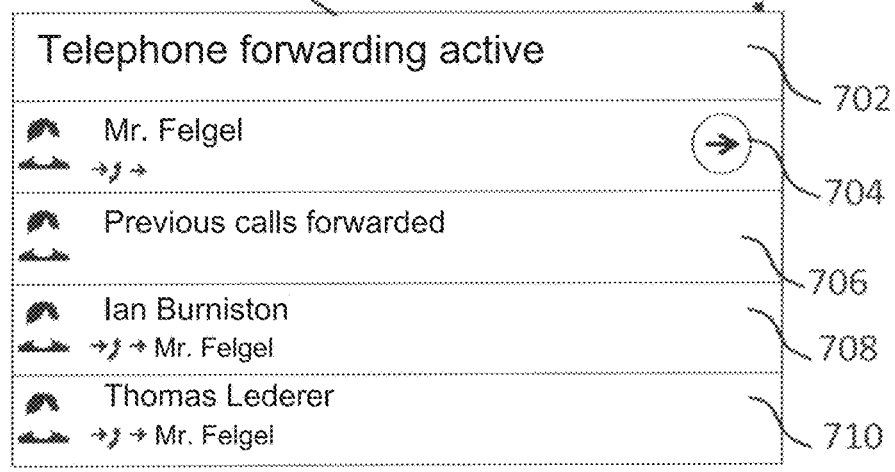
Figure 7A:
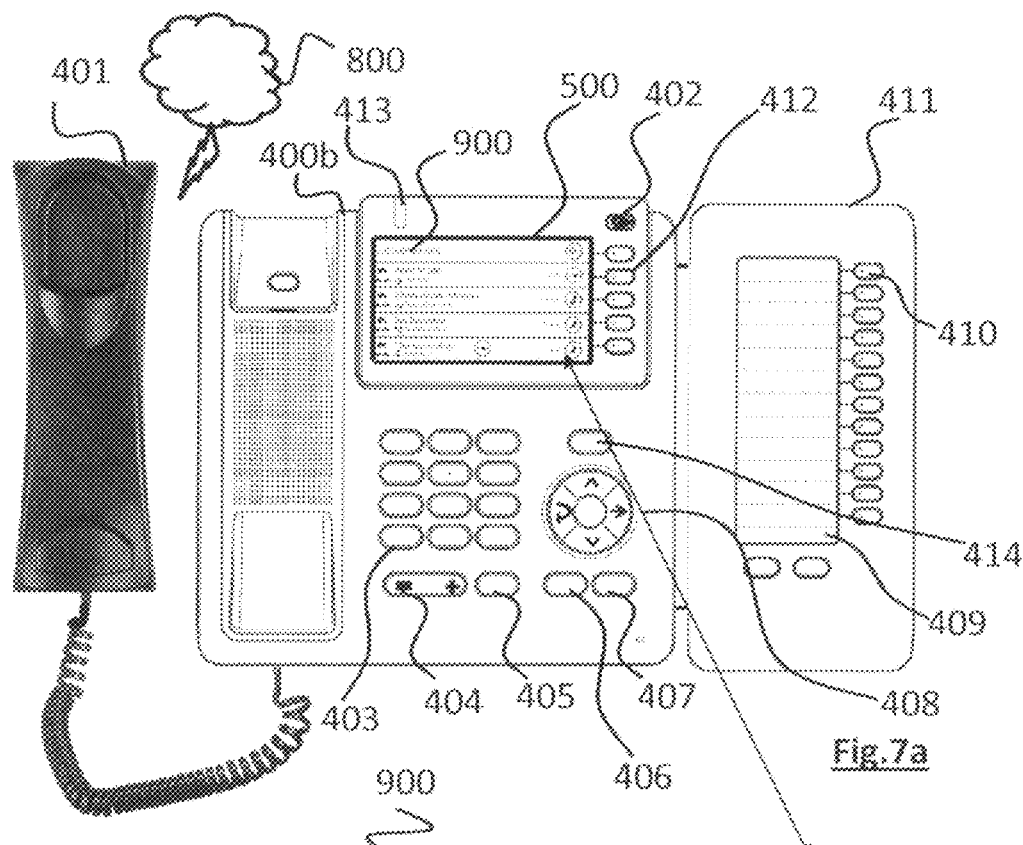
Figure 7B:
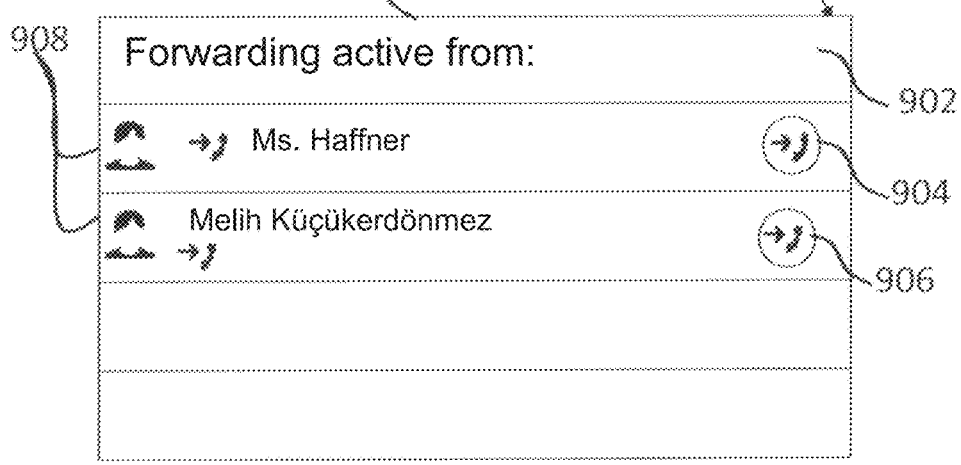

FIG. 2 is a diagram illustrating the flow of a first embodiment of the method according to the invention, and FIG. 3 is a diagram illustrating the flow of a second embodiment of the method according to the invention, FIG. 4a shows a telephone station with which the method according to the invention can be used, wherein FIG. 4b represents a display resulting from a first stage of the method, FIG. 5a shows a telephone station that can be used for reception with the method according to the invention and is identical to the telephone station from FIG. 4a, FIG. 5b shows a display for a further stage of the method, shown on the telephone station according to FIG. 5a, FIGS. 6a and 6b show the telephone station from FIG. 4a with a display that appears after the method according to the invention is executed, FIGS. 7a and 7b show the telephone station from FIG. 5a with a display that appears when the process according to the invention is completed.

The invention can be used in particular in the networking field for transmitting digital data, i.e., voice-over-IP telephony, voice-over-IP clients, mobile wireless telephones, and even e-mail traffic.

On such a data network, a user U1 often has access to multiple terminal devices 10, 12, and 14, in particular through a fixed network connection 10 with related fixed network equipment, a mobile wireless telephone connection with related mobile wireless telephone 12 (especially configured as a smart phone), or another connection device such as a tablet computer with corresponding SIM card, and he has a personal computer 14. The fixed network 10 is wired to a central data processing unit 16, which is also optionally suitable for mobile wireless telephony administration, further optionally accessed through the personal computer 14, in particular via the World Wide Web or another data network 18 using the address of the data connection on the server 16.

A user U2 has corresponding devices, fixed network connection 20, mobile wireless telephone 22 or similar, personal computer 24, wherein there are also connections, if applicable via the World Wide Web or a similar data network 28, to a central data processing unit (server) 30. The two central data processing units 16 and 30 are in turn connected to each other through a data network 32, for example the World Wide Web or telecommunication networks. This illustration can be further simplified if both users U1 and U2 use the same telecommunication provider, so the servers 16 and 30 are the same, i.e., there is only one server. It is also possible for user U1 to have one device that can connect to one server and another than can connect to the other server, for each telecommunication company. To understand the method, however, it is sufficient if each telecommunication or data terminal device (fixed network telephone for fixed network connections 10 and 20, mobile wireless telephones 12 and 22 and personal computers 14 and 24) is assigned to one data processing unit, through which the communication can be controlled. For example, if the subscriber on the fixed network connection 10 calls the subscriber on fixed network connection 20, a connection is created through the server 16, through the network 32, to the server 30 and to the fixed network connection 20. However, for example, if the fixed network connection 10 of the user U1 is called by another caller (not shown in FIG. 1), that call is intercepted in the range of the server 16 and forwarded or routed if necessary. The same applies to the function of the server 30 with respect to calls on the fixed network connection 20, and the same applies to the other terminal devices 12, 14, 22, and 24.

For digital communication it is always known, at which location a forward can be defined. Multiple options can be given here, e.g., forwarding can be executed on the terminal device itself or also on the data processing units, the servers 16, 30 and the like.

In a first embodiment of the method according to the invention, explained below with reference to FIG. 2, the user U1 enters an input to his fixed network connection 10, step S100, by which he defines that he wants incoming telephone calls to be forwarded to the fixed network connection 20 or the telecommunication terminal devices connected to it. Per a corresponding input, in step S102 the telecommunication terminal device on which that input is entered sends a corresponding message to the fixed network connection 20, where it is received in step S104. A display then appears on a terminal device on the fixed network connection 20, through which the user (if necessary in conjunction with, e.g., a ring tone or other alarm signal) is informed that he or his terminal device is the intended target of a forward. With step S100 or also step S104, a time measurement begins to run. The user U2 on the fixed network connection 20 is asked to authorize that he agrees to be the target of a forward. If, by the end of a time Δt, which is less than a predetermined maximum time $t_{max}$, the user U2 enters a corresponding authorization, so that the forward is authorized in step S106, then in step S108 a corresponding notification is sent back to the fixed network connection 10, or the terminal device on it, and received in step S110. Optionally, the terminal device on the fixed network connection 10 sends out a corresponding notification in step S112, which is transmitted in step S114 and received in step S116. The target of this message is the data processing unit 16, in which the corresponding notification is placed, indicating that forwarding is active. Now, if a call comes in from a third party (symbolized by fixed network connection 50) according to step S118, then in step S120 the terminal device on the fixed network connection 10 is activated and sends the incoming call according to step S122 on to the fixed network connection 20, where it is received in step S124 and where therefore a corresponding telephone call signal can be heard. Alternatively, the server 16 immediately forwards this call, without it reaching the fixed network connection 10 (see step S120' in FIG. 2).

As already explained above, as an alternative to transmitting the rerouting to a terminal device itself, rerouting to a data processing unit is also possible. In this second embodiment of the method according to the invention, which is described below with reference to FIG. 3, in step S200 the user U1 enters an input on his fixed network connection 10 or on the terminal device connected to it, indicating that he desires rerouting to the fixed network connection 20. With step S200, a time measurement begins to run. Now, in step S202, a corresponding notification regarding the input to the central data processing unit 16 is sent and is received there in step S204. The central data processing unit 16 manages the data and in step S206 sends a corresponding notification to the fixed network connection 20, wherein said notification is transmitted in step S208 and received in step S210. According to this notification, the user U2 is now asked to give an authorization, i.e., by means of a corresponding input to authorize, that he agrees to be the target of a forward from the fixed network connection 10.

According to FIG. 3, the user reacts quickly enough and gives such an authorization in step S212, and a corresponding notification is sent to the central data processing unit 16 in step S214 and received there in step S216. According to step S218, the central data processing unit 16 now sends a corresponding notification to the fixed network connection 10, which is transmitted in step S219 and received in step S220 by the fixed network connection 10 or the terminal device connected to it. Here there is a test to see whether the authorization was received within a predetermined time Δt since the beginning of the time measurement in step S200, which is less than a predetermined maximum time $t_{max}$.

If it was, then forwarding is activated, and either incoming calls S222 via another fixed network connection 50 are received in step S224, forwarded directly to the fixed network connection in step S226, and received there in step S228, where a telephone call signal can then be heard, or the call S222' from the fixed network connection 50 goes immediately into the central data processing unit 16 and is forwarded by it, without the fixed network connection 10 being involved at all. In this case, a message can still optionally be sent out by the server unit 16 in step S230, transmitted in step S232, and received by the terminal device on the fixed network connection 10 in step S234, by means of which the user U1 is informed that a call from the fixed network connection 50 was forwarded to the fixed network connection 20.

After that, for example, a telephone station 400*a*, 400*b* is shown, which can be used by both the user U1 and the user U2, in particular on the fixed network connection 10 or 20. The fact that the description given here with reference to FIGS. 2-7*b* relates to fixed network connections does not exclude the possibility of any forwarding combinations: for example, forwarding can take place from a mobile wireless telephone connection to a fixed network connection, to another mobile wireless telephone connection, or even by sending an SMS to a personal computer, or vice versa from the personal computer to these terminal devices. An SMS can also be forwarded to multiple devices at the same time. The same is also true for an e-mail. Then the same steps that occur above for authorizing the forwarding directed to a connection (in the example: fixed network connection 20) can also occur in its range (i.e., on the terminal device on the fixed network connection 20), but they can optionally also occur on another telecommunication or data terminal device for the same user. Therefore, calls from the mobile wireless telephone 12 to the mobile wireless telephone 22 can still be forwarded with authorization to the telephone station on the fixed network connection 20, and vice versa.

The fixed network telephone station 400*a* shown in FIG. 4*a* corresponds to the type OpenScape Desk Phone CP600, which is described in the application with official file number 10 2016 112 685.3, submitted to the German Patent and Trademark Office in English under the title: "Harmonizing telephony conversations involving embedded devices and social media applications." It is sold and distributed by Unify Software and Solutions GmbH & Co. KG, Mies-van-der-Rohe-Straße 6, D-80807 Munich, Germany.

A telephone handset 401 is used for making and receiving calls (speaker and microphone). A central component of the station is expanded by means of a module 411, on which a directory 409 of call targets is available, with a quick selection button 410 assigned to each of them. Below the screen 500 there is an alphanumeric telephone keypad 403, and below that a volume control 404, a mute button 405, a speaker button 406, a button 407 for activating a headset, connected to the connector 413, for example, a "Toggle-to-menu" button 414, and a rocker button 408 for entering selections, in particular moving through the rows in the display 300 shown on the screen 500. The rocker button 408 can be rocked upward and downward to move farther up and down through the rows that can be called up in the display 300. Rocking to the right or left allows movement within the rows. Instead of navigating using the rocker button 408, individual rows can also be called up immediately using the keys 412. With the button 402 the user of the telephone station 400*a* can indicate that he is at his desk or absent.

FIG. 4*b* shows an enlarged view of the display 300 that is on the screen 500 in FIG. 4*a*. After a corresponding menu item is called up using a particular combination of buttons, the prompt "Activate call forwarding to:" appears in row 302, followed by a symbol indicating to search for a participant here. The user U1 can now select such a participant immediately on the telephone station 400*a* in the rows 304, 306, 308, 310 located below the prompt, whose fixed network connection or mobile wireless telephone would be the object of the forwarding. Alternatively, he can also input a telephone number using the alphanumeric keypad 403. Next to the names in the individual rows 304, 306, 308, 310, corresponding symbols 312 are displayed, which indicate that a telephone connection is involved. These can be placed centrally. As previously indicated, individual services can be merged in the "Circuit" applet from Unify Software and Solutions GmbH & Co. KG., so a catalogue of contacts for the user U1 can be constantly available on his telephone station 400*a*. Here, for example, the telephone station 400*a*, as shown in FIG. 4*a*, is connected to other terminal devices via a data network 800; this allows the contacts stored on a mobile wireless telephone belonging to user U1 to be connected to the telephone station 400*a* and displayed there as described above.

The display sequence according to FIG. 4*b* can be dependent upon the frequency of calls with these people or upon the frequency of previous forwarded calls that were activated at some point in time, and the like. The user can also search for his favorites, who are then queried during call forwarding.

If the user now wishes to make "Mr. Felgel" the target of a forwarded call, for example, he must push once upward on the rocker button 408, and then activate this row, e.g., press the middle of the rocker button 408 or the button 412 next to the corresponding row.

FIGS. 5*a* and 5*b* now show what happens on the same telephone station 400*b* for the user U2 (Mr. Felgel): if the user U1 is "Ms. Haffner," then for the user U2 on his telephone station 400*b* according to FIGS. 5*a*/5*b*, the display 600 on the screen 500 indicates: According to row 602, the user U2 is requested by means of a symbol 612 to authorize the forwarding indicated in the row 604 below it, wherein a symbol 606 clearly shows that it originates from Ms. Haffner (user U1).

The user U2 can now give the authorization either by immediately pressing the corresponding button 412 next to the row 402 or the button next to the row 404, or he can also use the rocker button 408 to move downward and then give the authorization by pressing the center of the rocker button 408.

The procedures listed here and described with reference to FIGS. 4*a*/4*b* correspond to the input in step S100 or S200 from FIG. 3. The procedures described with reference to FIGS. 5*a*/5*b* correspond to the input from the user U2 in the steps S106 or S212 according to FIG. 2 or FIG. 3.

FIGS. 2 and 3 do not show what happens after authorization is completed. This will now be explained based on FIGS. 6*a*/6*b* and 7*a*/7*b*.

The telephone station 400*a* for the user U1 indicates to whom a telephone forward is active; see the display 700 now shown on the screen 500. Next to the informative row 702, row 704 shows that the target of the forwarding is Mr. Felgel. The row 706 contains text stating "previous calls forwarded:" and the rows 708 and 710 indicate that in the past the participant "Ian Burniston" wanted to call Ms. Haffner (user U1 with telephone station 400*a*) and that this call was forwarded to user U2 (Mr. Felgel). The row 710 indicates the same thing for the participant "Thomas Lederer," whose call was also forwarded to Mr. Felger. On the telephone belonging to the user U2 (Mr. Felgel) the display 900 is now shown on the screen 500; see row 902 with the text "Forwarding active from:". The rows 904 and 906 below that indicate from whom a forward has come, here from Ms. Haffner (according to row 904) and from the participant "Melih Küçükerdönmez". As an alternative to the display according to FIGS. 7*a*/7*b*, there can also be an indication of which third parties the forward through Ms. Haffner to the telephone station 400*b* previously came from. The symbols 908 show that the persons from whom forwarding is active here are contacts of the user U2 (Mr. Felgel) that are defined in the "Circuit" applet.

All of the foregoing embodiments are equally applicable to the situation in which conference calls are to be set up automatically: Here a user can define in advance that a conference call is to be initiated by routing the call to another participant or multiple other participants with simultaneous maintenance of receipt of the call.

The figures do not show that times can be indicated, by the user U1 or by the user U2, or by the user U1 and then corrected by the user U2, during which forwarding is to be in effect. This makes it possible to generally indicate that forwarding is active in the afternoons for a person who only works half-days. Forwarding can also be time-limited, e.g., to the duration of an absence. It is also possible, in the case of a forwarded telephone call, that forwarding to the user U2 is no longer valid if he does not answer after a predetermined length of time, and instead level-2 forwarding to another user occurs. This user is also generally queried in advance for authorization.

In FIGS. 2 and 3 it was required in advance that the user U2 had to give authorization quickly enough. Here it can be possible for the user to actively deny authorization, and then the same sending procedures apply, but not the later forwarding. Alternatively, it is further possible that forwarding ceases to be active after the end of $t_{max}$, even with authorization from the user U2. In this way it can be defined that, if there is no activity from the user U2 within the predetermined time $t_{max}$, the forwarding request expires.

DRAWING REFERENCE LIST (TO BE CONSIDERED AN INTEGRAL PART OF THE DESCRIPTION)

U1 User
U2 User
10 Data and/or telephone connection/terminal device (fixed network connection)
12 Data and/or telephone connection/terminal device (mobile wireless telephone)
14 Data and/or telephone connection/terminal device (personal computer)
16 Data processing unit (server)
18 Data network
20 Data and/or telephone connection/terminal device (fixed network connection)
22 Data and/or telephone connection/terminal device (mobile wireless telephone)
24 Data and/or telephone connection/terminal device (personal computer)
28 Data network
30 Data processing unit (server)
32 Data network
50 Data and/or telephone connection (fixed network connection)/sender
S100 Step S100 (input on fixed network connection/definition of the second data and/or telephone connection)
S102 Step S102 (sending a message)
S104 Step S104 (receiving the message)
S106 Step S106 (forwarding)
S108 Step S108 (sending a notification back)
S110 Step S110 (receiving the notification)
S112 Step S112 (optionally sending a notification)
S114 Step S114 (transmitting the notification)
S116 Step S116 (receiving the notification)
S118 Step S118 (incoming call from a third party)
S120 Step S120 (activating the terminal device)
S120' Step S120' (alternative forwarding of the call)
S122 Step S122 (forwarding the call)
S124 Step S124 (receiving the call)
S200 Step S200 (input on the terminal device and start of time measurement)
S202 Step S202 (sending a notification)
S204 Step S204 (receiving the notification)
S206 Step S206 (sending a notification)
S208 Step S208 (transmitting the notification)
S210 Step S210 (receiving the notification)
S212 Step S212 (authorization)
S214 Step S214 (sending a notification)
S216 Step S216 (receiving the notification)
S218 Step S218 (sending a notification)
S219 Step S219 (transmitting a notification)
S220 Step S220 (receiving the notification)
S222 Step S222 (forwarding to 50)
S222' Step S222' (possible immediate forwarding via 16)
S224 Step S224 (receiving the call)
S226 Step S226 (forwarding to fixed network connection)
S228 Step S228 (receiving the call)
S230 Step S230 (sending a message)
S232 Step S232 (transmitting the message)
S234 Step S234 (receiving the message)
300 Display
302 Row in the display 300
304 Row in the display 300
306 Row in the display 300
308 Row in the display 300
310 Row in the display 300
312 Symbol (representing telephone connections)
400a Telephone station
400b Telephone station
401 Telephone handset
402 Presence button
403 Alphanumeric telephone keypad
404 Volume control
405 Mute button
406 Speaker button
407 Activation button
408 Rocker button
409 Directory in the module 411
410 Quick selection button
411 Expanding module with directory of call targets
412 Buttons (except the rocker button 408)
413 Headset connector
414 Toggle-to-menu key
500 Screen
600 Display
602 Query row in the display 600
604 Authorization row in the display 600
606 Symbol in the display 600
612 Symbol in the display 600 (for telephone connections)
700 Display
702 Row in the display 700
704 Row in the display 700 (indicating the forwarding target)
706 Row in the display 700 ("previous calls forwarded")
708 Row in the display 700
710 Row in the display 700
800 Data network
900 Display
902 Row in the display 900 ("Forwarding active from:")
904 Row in the display 900 (from whom the transfer came)
906 Row in the display 900 (from whom the transfer came)
908 Symbol in the display 900

What is claimed is:

1. A method for executing routing of an object of a communication activity, which is sent from a sender terminal device to a first user terminal device of a first user via a first data connection and/or telephone connection so that the object of the communication activity is routable to a second user terminal device of a second user via a second data connection and/or telephone connection when the object is received within a first pre-selected time period and prior to authorization of a routing change that approves of the routing of the object to the second user terminal device, the method comprising:
prior to the object of the communication activity being sent, defining the second data connection and/or telephone connection with respect to the first data connection and/or telephone connection via the first user terminal device so that the object is routable to the second user terminal device;
in response to the defining of the second data connection and/or telephone connection, immediately implementing a routing change so that the object is routable to the second user terminal device via the second data connection and/or telephone connection before approval of the routing change is received from a second user of the second user terminal device;
sending a first notification regarding the defining of the second data connection and/or telephone connection for authorization of the routing change;
deactivating the routing change in response to (i) a second notification that responds to the first notification to deny authorization for the routing change or (ii) a non-receipt of a second notification that approves the routing change within a first pre-selected time period, the deactivating occurring to prevent any subsequent routing of communication objects to the second user terminal device.

2. The method of claim 1, comprising:
preventing the routing of the object to the second user terminal device in response to the deactivating occurring prior to the object being sent toward the first user terminal device.

3. The method of claim 1, wherein the sender terminal device is a first sender terminal device, the communication activity is a first communication activity of the first sender terminal device, and the object is a first object of the first communication activity, the method comprising:
routing of the first object to the second user terminal device prior to the deactivating occurring based on the defining of the second data connection and/or telephone connection;
preventing the routing of a second object so that the second object is not routed to the second user terminal device in response to the deactivating occurring prior to the object being sent toward the first user terminal device, the second object being sent from a second sender terminal device to the first user terminal device after the first object was sent to the first user terminal device.

4. The method of claim 1, wherein the immediately implementing of the routing change so that the object is routable to the second user terminal device via the second data connection and/or telephone connection before approval of the routing change is received from the second user of the second user terminal device comprises:
a server performing the routing change in response to the defining, the server having a processor connected to a non-transitory computer readable medium, the server being connected between the first user terminal device and the second user terminal device.

5. The method of claim 1, wherein the immediately implementing of the routing change so that the object is routable to the second user terminal device via the second data connection and/or telephone connection before approval of the routing change is received from the second user of the second user terminal device comprises:
a first user terminal device performing the routing change in response to the defining, the first user terminal device having a processor connected to a non-transitory computer readable medium.

6. The method of claim 1, wherein the first user terminal device has a processor connected to a non-transitory computer readable medium.

7. The method of claim 6, wherein the first user terminal device comprises a telephone.

8. The method of claim 7, wherein the object is a telephone call for establishing a telephone telecommunication session connection.

9. The method of claim 8, wherein the telephone telecommunication session connection involves the transmission of audio data.

10. The method of claim 1, wherein:
the deactivating is maintained even after a second notification that approves the routing change is received after the first pre-selected time period expires.

11. A communication apparatus comprising:
a first user terminal device of a first user communicatively connectable to a first sender terminal device of a first sender via a first data connection and/or telephone connection so that a first object of a first communication activity is routable from the first send terminal device to the first user terminal device;
the first user terminal device configured to implement a routing change such that the first object is routable to a second user terminal device of a second user via a second data connection and/or telephone connection when the first object is received within a first pre-selected time period and prior to authorization of a routing change that approves of the routing of the first object to the second user terminal device being received by facilitating a defining of the second data connection and/or telephone connection prior to receipt of the first object with respect to the first data connection and/or telephone connection so that, in response to the defining of the second data connection and/or telephone connection, the routing change is implemented so that the first object is routable to the second user terminal device via the second data connection and/or telephone connection before approval of the routing change is received from a second user of the second user terminal device.

12. The communication apparatus of claim 11, wherein the first user terminal device is configured to facilitate performance of the defining so that the routing change is deactivated in response to (i) a second notification that responds to a first notification sent to the second user terminal device concerning the routing change to deny authorization for the routing change or (ii) a non-receipt of a second notification that approves the routing change within a first pre-selected time period after a first notification is sent to the second user terminal device concerning the routing change,
wherein deactivation of the routing change occurs to prevent any subsequent routing of a second object of a second communication activity directed to the first user terminal device to the second user terminal device.

13. The communication apparatus of claim 12, wherein the first user terminal device has a processor connected to a non-transitory computer readable medium.

14. The communication apparatus of claim 13, wherein the first user terminal device is a telephone.

15. The communication apparatus of claim 14, wherein the first object is a telephone call for establishing a telephone telecommunication session connection, the telephone telecommunication session connection involving the transmission of audio data.

16. The communication apparatus of claim 12, wherein:
the deactivation of the routing change is maintained even after a second notification that approves the routing change is received after the first pre-selected time period expires.

17. The communication apparatus of claim 11, comprising:
a server and the second user terminal device, the server connected between the first user terminal device and the second user terminal device.

18. The communication apparatus of claim 17, wherein the server is configured to receive data from the first user terminal device concerning the defining of the of the second data connection and/or telephone connection prior to receipt of the first object to implement the routing change.

19. The communication apparatus of claim 18, wherein the server is configured to send a notification concerning the routing change to the second user terminal device to facilitate receipt of data approving or denying of the routing change.

20. The communication apparatus of claim 17, wherein:
the first user terminal device has a processor connected to a non-transitory computer readable medium;
the second user terminal device has a processor connected to a non-transitory computer readable medium; and
the server has a processor connected to a non-transitory computer readable medium.

* * * * *